United States Patent [19]

Imel et al.

[11] Patent Number: 4,823,260
[45] Date of Patent: Apr. 18, 1989

[54] MIXED-PRECISION FLOATING POINT OPERATIONS FROM A SINGLE INSTRUCTION OPCODE

[75] Inventors: Michael T. Imel, Beaverton; Konrad Lai, Aloha; Glenford J. Myers, Aloha; Randy Steck, Aloha; James Valerio, Portland, all of Oreg.

[73] Assignee: Intel Corporation, Santa Clara, Calif.

[21] Appl. No.: 119,547

[22] Filed: Nov. 12, 1987

[51] Int. Cl.⁴ .............................................. G06F 7/48
[52] U.S. Cl. ................................... 364/200; 364/745; 364/748
[58] Field of Search ... 364/200 MS File, 900 MS File, 364/745, 748, 736.5

[56] References Cited

U.S. PATENT DOCUMENTS

| | | | |
|---|---|---|---|
| 4,449,196 | 5/1984 | Pritchard | 364/745 |
| 4,620,292 | 10/1986 | Haginara et al. | 364/748 |
| 4,654,785 | 3/1987 | Nishiyama | 364/200 |
| 4,748,580 | 5/1988 | Ashton et al. | 364/736 |
| 4,763,294 | 8/1988 | Fong | 364/748 |
| 4,779,220 | 10/1988 | Nakiyama | 364/748 |
| 4,788,655 | 11/1988 | Nakayama et al. | 364/748 |

Primary Examiner—Gary V. Harkcom
Assistant Examiner—Christopher H. Lynt
Attorney, Agent, or Firm—Owen L. Lamb

[57] ABSTRACT

Apparatus for performing mixed precision calculations in the floating point unit of a microprocessor from a single instruction opcode. 80-bit floating-point registers (44) may be specified as the source or destination address of a floating-point instruction. When the address range of the destination indicates (26) that a floating point register is addressed, the result of that operation is not rounded to the precision specified by the instruction, but is rounded (58) to extended 80-bit precision and loaded into the floating point register (FP-44). When the address range of the source indicates (26) that an FP register is addressed, the data is loaded from the FP register in extended precision, regardless of the precision specified by the instruction. In this way, real and long-real operations can be made to use extended precision numbers without explicitly specifying that in the opcode.

4 Claims, 3 Drawing Sheets

MIXED-PRECISION FLOATING POINT OPERATIONS FROM A SINGLE INSTRUCTION OPCODE

CROSS REFERENCES TO RELATED APPLICATIONS

Copending patent application Ser. No. 863,878 filed May 16, 1986, of Myers, et al., entitled "Stack Frame Cache on a Microprocessor Chip" and copending patent application Ser. No. 935,193 filed Nov. 26, 1986, of Budde, et al., entitled "Register Scoreboarding on a Microprocessor Chip", both assigned to Intel Corporation, the assignee of the present invention.

TECHNICAL FIELD

The present invention relates to data processing systems, and more particularly to apparatus for performing mixed precision calculations in the floating point unit of a microprocessor.

BACKGROUND OF THE INVENTION

Background Art

The Intel iAPX 286/20 Numeric Data Processor (NDP) has a floating point instruction set that supports the IEEE Microprocessor Floating Point Standard P754. The NDP has eight 80-bit floating point registers which provide a capacity equivalent to forty 16-bit registers. Two 16-bit registers control and report the results of numeric instructions. A control word register defines the rounding, infinity, precision, and error-mask controls required by the IEEE standard. In order to accommodate extended-precision floatingpoint calculations, the NDP supports 32-bit, 64-bit, and 80-bit real values. The 80-bit real values are used internally by the eight 80-bit floating point registers for extremely high precision calculations. To implement this arithmetic capability requires a separate opcode for each instruction which specifies a floating-point data type. This results in a number of separate opcodes in order to achieve all possible combinations of floating-point data types. Extra conversion instructions are necessary to convert and round the extended real result to the desired destination format with double rounding. It is desirable to reduce the number of floating point operations in order to simplify the programming and increase the performance of floating-point operations.

It is therefore an object of the present invention to provide an apparatus for performing a number of kinds of mixed precision calculations in the floating point unit of a microprocessor utilizing a single instruction opcode.

BRIEF DESCRIPTION OF THE INVENTION

Briefly, the above object is accomplished in accordance with the invention as follows. An instruction decoder generates a microinstruction, one bit of which, when asserted, specifies that the address range of the source or destination address in the macroinstruction is an 80-bit floating point register in the floating point unit. Logic in the floating-point unit responsive to this one bit forces the result of the floating point operation to extended precision, regardless of the precision specified in the instruction.

This technique has the advantage that mixed precision arithmetic can be supported as well as extended precision arithmetic using a single opcode instead of many different opcodes.

Mixed precision arithmetic avoids extra conversion instructions, allows computation of the result to sufficient precision instead of the widest precision, and does not incur double-rounding in the arithmetic operation if the intermediate result is rounded to extended precision first.

DESCRIPTION OF THE DRAWINGS

The foregoing and other objects, features, and advantages of the invention will be apparent from the following more particular description of a preferred embodiment of the invention as illustrated in the accompanying drawings wherein.

DESCRIPTION

Figure 1:
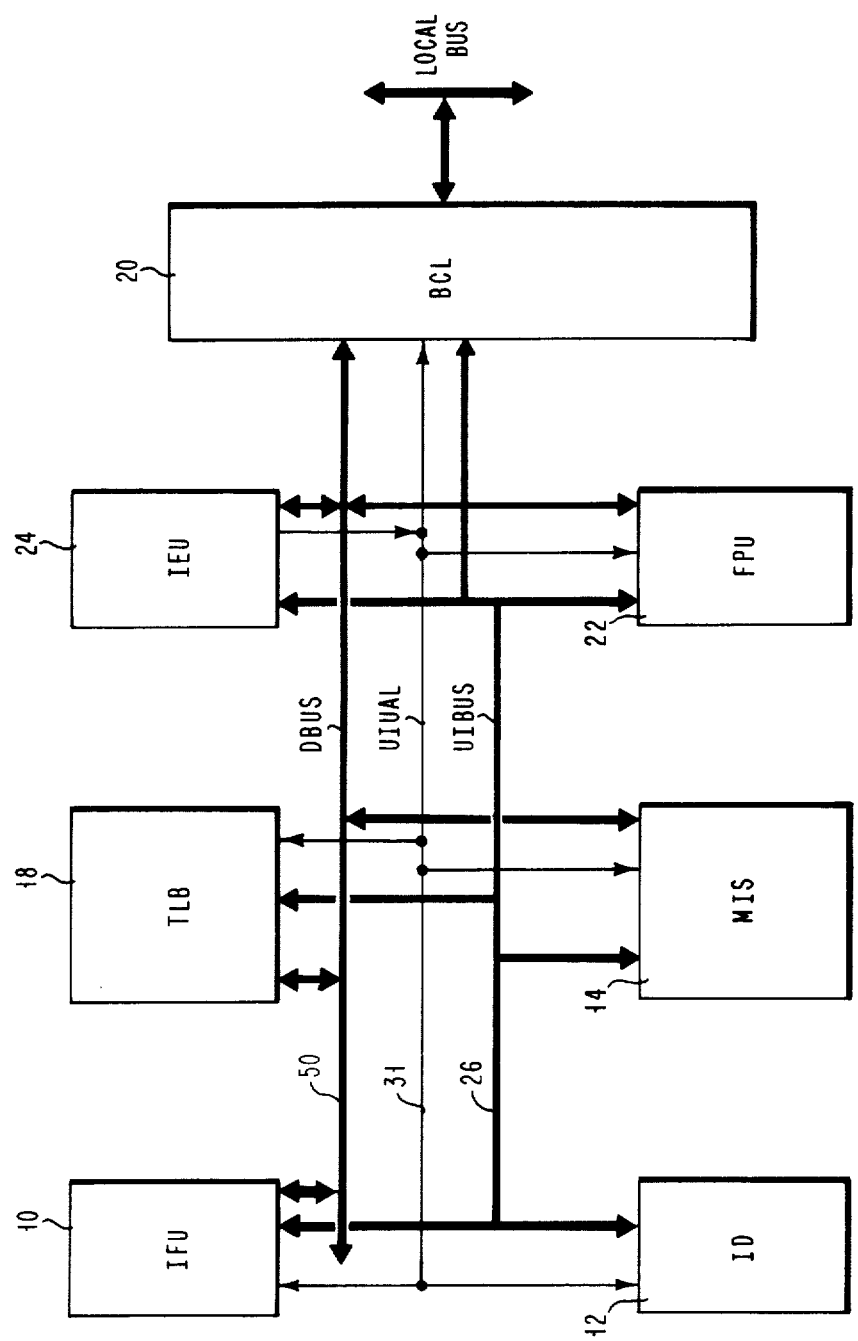
FIG. 1 is a functional block diagram of each of the major components of the microprocessor in which the invention is embodied.

Referring now to FIG. 1, the microprocessor is logically subdivided into seven major units: the Instruction Fetch Unit (IFU-10), the Instruction Decoder (ID-12), the Microinstruction Sequencer (MIS-14), the Translation Lookaside Buffer (TLB-18), the Floating Point Unit (FP-22), the Bus Control Logic (BCL-20), and the Integer Execution Unit (IE-24).

Communication paths between all of these units include 1 32-bit data bus (Dbus-50), a 29-bit microinstruction bus (UIBUS-26), and a microinstruction-valid signal (UIVAL-31). The microinstruction bus controls and synchronizes the activities of the autonomous units. This subdivision, together with the ability for each unit to sequence itself autonomously, allows for parallel and pipelined activities inside the chip that result in high performance. Each of the units is described briefly below.

The Instruction Fetch Unit (IFU-10) fetches, prefetches, and caches instructions from memory for use by the ID (12). The IFU also maintains six instruction pointers that track instructions through the pipeline. The IFU caches the most recently used blocks of instructions and keeps the instruction decoder supplied with a stream of instruction. It also contains the operand reduction logic controlled by the ID.

The Instruction Decoder (ID) decodes and controls instruction (macrocode) execution. It decodes instructions, performs operand addressing and fetching, handles branch instructions (i.e., instruction pointer manipulation), and either emits execution microinstructions (for simple instructions) or starts microprogram flows (for complex instructions).

The Microinstruction Sequencer (MIS) sequences microcode flows to handle chip initialization, macroinstructions that are too complex to handle directly, and exception and interrupt conditions. The MIS contains a 3K by 42-bit microcode ROM and sequencing logic for microcode flows. The functions that the MIS performs include: fetch the next microinstruction, microprogram branching, handle exception conditions, maintain a scoreboard on the register file, and in conjunction with the ID, detect macroinstruction-boundary and trace events.

The IEU executes most of the microinstructions issued by the ID and the MIS. It contains the registers visible to the programmer, scratch registers used by microcode, a 32-bit ALU, a 32-bit barrel shifter, and the logic needed to execute its instructions. It features an ALU bypass path that allows ALU operations to be executed at the rate of one per cycle. It also contains a single-port register file that can be accessed twice in one cycle such that the result from the previous operation can be stored in the same cycle as a new operand is being fetched for the current operation.

The Translation Lookaside Buffer (TLB) performs the address translation needed to implement virtual memory mechanisms.

The Bus Control Logic (BCL) pipelines and sequences external bus accesses. The BCL contains the interface hardware to the external local bus, manages the bus protocol, and recognizes external events (e.g., interrupts, initialization). It contains an outgoing 33-bit wide address and data FIFO, an incoming 33-bit data FIFO, and a sequencer. The outbound FIFO allows up to 3 requests to be queued in the BCL so that the rest of the processor can proceed with execution, independent of the memory access latency. The inbound FIFO buffers read data returning from external memory until a free cycle is available to transfer the data to its destination.

The Floating Point Unit (FPU-22) contains the logic needed to perform floating point operations, and integer multiply and divide.

Floating point (FP) representation is a number representation system in which each number, as represented by a pair of numerals, equals one of those numerals times a power of an implicit fixed positive integer base where the power is equal to the implicit base raised to the exponent represented by the other numeral. Thus, the exponent indicates the power to which the base is raised.

Figure 2:
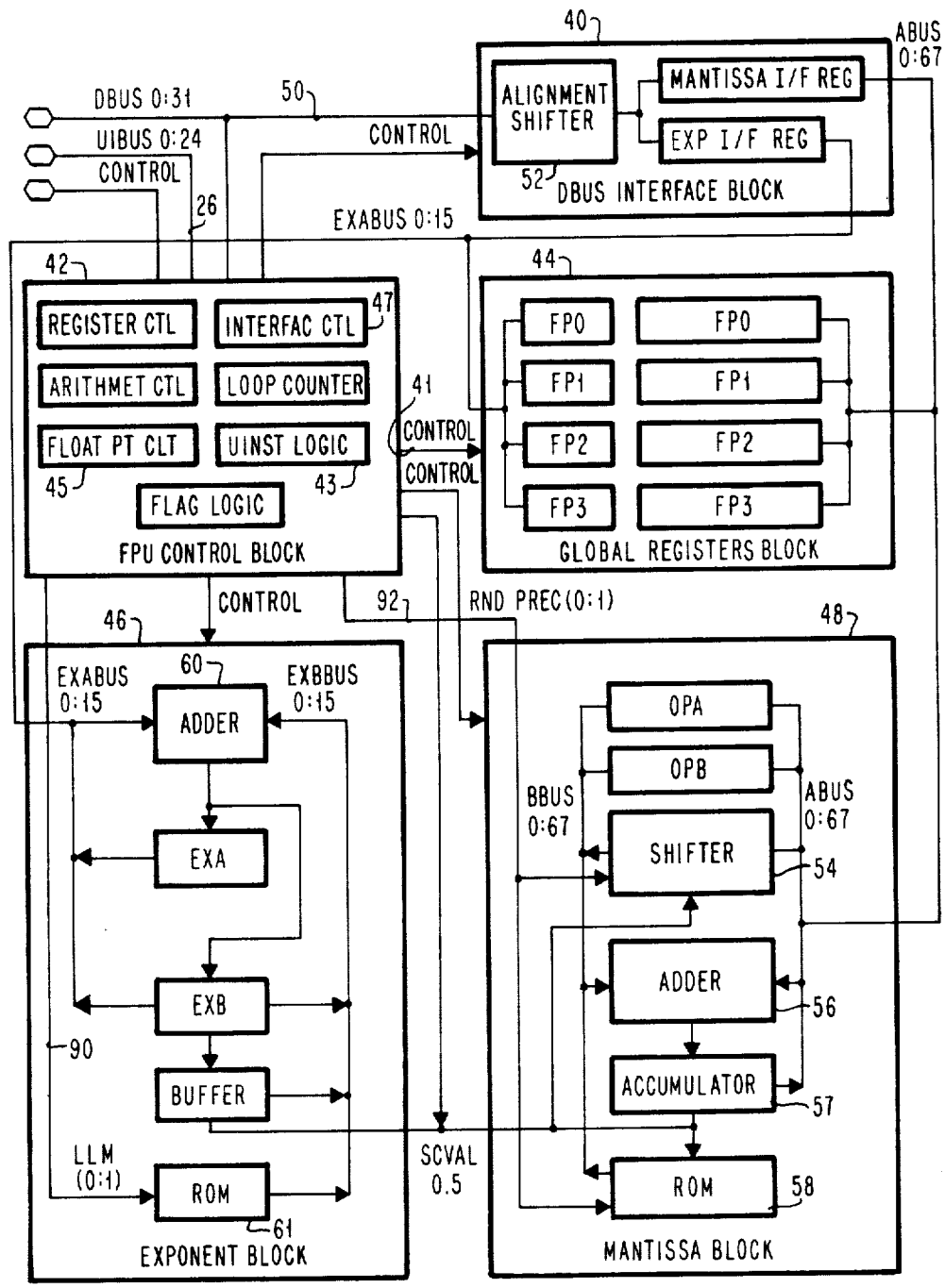
FIG. 2 is a more detailed block diagram of the floating point unit (FPU) of FIG. 1; and, FIG. 3 is a diagram of the logic for forcing extended precision.

Referring to FIG. 2, the FPU is comprised of five major logic blocks. The Dbus interface block (40), the FPU control block (42), the global registers block (44), the exponent block (46) and the mantissa block (48).

The global registers block (44) contains four 80-bit floating point registers (FPO-FP3), each having a mantissa portion and exponent portion.

The mantissa block (48) includes a 68-bit shifter (54) that can shift up to 16 bits in either direction, a 69-bit mantissa adder (56), a significant bit finder, and a mantissa ROM (58).

The exponent block (46) provides a separate exponent data path that includes a 16-bit adder (60), an exponent ROM (61), and two operand registers (EXA, EXB). Two internal 68-bit data paths, the A bus and the EXA bus, are provided. The exponent ROM contains four 15-bit constants which are used to bias the exponent in conversion operations. The ROM can address the EXABUS directly and is addressed by the control block (42) and the length of the microinstruction (LLM 0:1).

Since the data bus (DBus-50) is 32 bits wide, the alignment shifter (52) in the data bus interface unit (40) aligns the various data types to the correct positions on the internal ABus and EXABus.

There are three forms of floating-point numbers: the real form, which is 32 bits long; the long-real form, which is 64 bits long; and the extended-real form, which is 80 bits long. In the macroinstruction there are three address fields, src1 (source 1), src2 (source 2), and dst (destination) which specify the address of the register from which data will be taken (src1, src2) or to which the result of an arithmetic operation will be returned (dst). Associated with these three fields are three bits (CCC) in the macroinstruction. The format of the macroinstruction is as follows:

| fop | src1 | src2 | dst | CCC |
|-----|------|------|-----|-----|

The first field (fop) is the mnemonic form of the opcode; src1, src2, and dst are the operand forms source, source and destination; and the CCC field which indicates, in the case of a floating point operation (fop), that the register field with which a bit is associated is actually an address of either a floating-point register or floatingpoint literal.

The following is a table of the possible macroinstruction specifications for mixed precision possibilities (reg denotes a general register and fpr denotes floating point register):

| fop | src1 | src2 | dst | CCC | COMMENT |
|-----|------|------|-----|-----|---------|
| fop | reg, | reg, | reg | 000 | typically, this is the only mode |
| fop | reg, | fpr, | reg | 010 | 6 mixed precision |
| fop | fpr, | reg, | reg | 100 | possibilities |
| fop | fpr, | fpr, | reg | 110 | |
| fop | reg, | reg, | fpr | 001 | |
| fop | reg, | fpr, | fpr | 011 | |
| fop | fpr, | reg, | fpr | 101 | |
| fop | fpr, | fpr, | fpr | 111 | extended precision |

The floating-point (FP) registers are used as the source or destination of a floating-point instruction. In accordance with the principles of the present invention, when an FP register is used as destination, the result of that operation is not rounded to the precision specified by the instructions opcode, but is rounded to extended 80-bit precision and loaded into the specified FP register. When an FP register is used as a source of an operand, the data is loaded from the FP register in extended precision, regardless of the precision specified by the instruction opcode. In this way, real and long-real operations can be made to use extended precision numbers without explicitly specifying that in the opcode.

Also there is no opcode for the extended-real format. When all operands are FPR, it is equivalent to an extended real instruction. For example, a real-multiply operation which specifies floating-point registers as input registers will perform an extended-real multiply, but only a 32-bit number will be written out.

The instruction decoder (12) of FIG. 1, determines from the three-bit field (CCC) that the address range of a floating-point register is specified. If a floating-point register is specified, the instruction decoder sets a bit (opcod 1) in the microinstruction that is generated by the instruction decoder and sent over the UIBUS (26) to the floating point unit (22). The precision for the operation is specified in the opcode by a field (the LL field) of two bits which are encoded as follows:

| LL | PRECISION |
|----|-----------|
| 00 | 32 bit (real) |
| 01 | 64 bit (long real) |
| 10 | 80 bit (extended real) |

Figure 3:
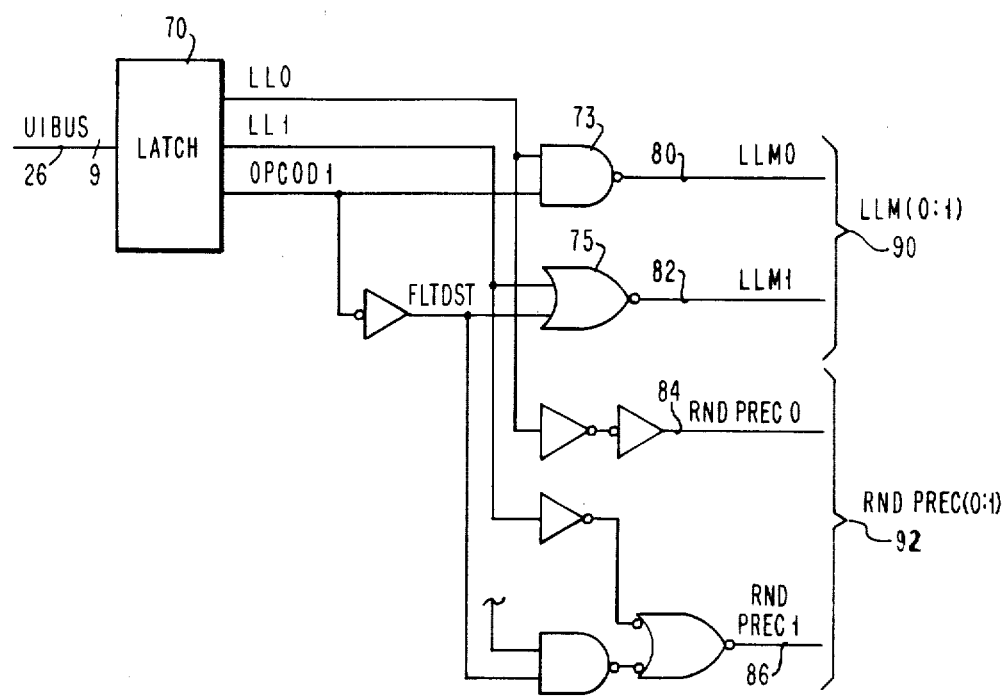

The microinstruction logic (43) within the FPU control block 42 is shown in more detail in FIG. 3. The circuit shown in FIG. 3 latches the LL bits from the microinstruction bus in a latch (70). The opcod 1 bit is also latched. The signal FLTDST is derived from the OPCOD 1 bit to indicate that either the source or destination field of the operation is a floating-point register. This information is used to mux the correct address onto the floating-point register address lines (included in control lines-41) and also to indicate to the floating-point (I/O controller (45) that a floating-point register is being used.

As shown in FIG. 3, the opcod 1 bit forces the LL bits on the outputs LLM 0 and LLM 1. The modified bits (outputs LLM 0 and LLM 1) are then presented to the ROM in the exponent block (46) of FIG. 1. The LLM bits select the exponent bias constant in the exponent ROM (61) to force the appropriate bias on the exponent. In this manner, the circuit overrides the precision control inherent in the opcode and forces the precision to extended-real precision.

Rounding of a floating-point operation is forced to extended real precision through the use of logic in FIG. 3. The round precision bits (Rnd Prec 1, Rnd Prec 2) shown in FIG. 3, are connected to the mantissa ROM (58) where they are utilized to select the appropriate rounding constant in the mantissa ROM. Since there are three different data types to round, the ROM (58) stores three mantissa constants available for use in the rounding process. The logic of FIG. 3 forces the RNDPREC bits to select the rounding constant associated with the 80-bit extended real data type when a FP register is addressed. The round precision bits also are connected to the shifter (54) where they select the bits that are to be used in the rounding of the final result.

Rounding is performed in order to make the result of a FP operation more accurate by modifying it in accordance with four rounding modes:

| RR | ROUNDING MODE |
| --- | --- |
| 00 | round_to_negative_infinity |
| 01 | round_to_positive_infinity |
| 10 | round_to_zero |
| 11 | round_to_nearest |

If a floating-point register is specified, the bit (opcod 1) that is set in the microcode generates the FLTDST signal. The rounding precision in the opcode specified by the LL field of two bits is over-ridden and the rounding precision is forced by altering the RNDPREC bits 0 and 1. In this manner the rounding precision is forced to be the most precise regardless of the rounding precision specified in the microinstruction.

The result of the operation will be placed on the EXA bus and the A bus by the interface control (47). The microcode within the interface control (47) recognizes whether the operation involves floating-point registers and either writes the result back into the floating-point registers (44), or transfer the data over the data bus (50) to an external unit. EXAMPLE:

Consider the real multiply macro instruction DIVR G0, G1, FP0. In this macro two 32 bit registers are specified to be divided and a floating point register is specified as the destination for the result. The microinstruction sequence that is generated is as follows:

| MOV_TO_FPU | move to FPU register G0 |
| --- | --- |
| MOV_TO_FPU | move to FPU register G1 |
| DIV | divide real FP0 |
| MOV_FROM_FPU | move to FP0 |

MOV TO FPU

This move causes a number contained in G0 in the integer execution unit (24) to move to the FPU (22) across the data bus (50). This number comes through the D-bus interface (40), and is loaded into one of the registers (44) so the number is split into two parts, the mantissa portion and the exponent portion.

MOV TO FPU

This move also loads one of the operand registers and the other exponent register. Two mantissas and two exponents have been loaded.

DIV

The FPU does the divide using the previously loaded values. The result is stored in the accumulator (57). Since all interim operations are done in extended real form the last step in the divide is rounding to the proper precision. The rounding must be to the correct 32 bit (real) number, 64 bit (long real) number or 80 bit (extended real) number. In this example, since a floating point register is specified as the destination, the rounding is done to extended real precision even though the macroinstruction opcode specifies a real divide instruction.

MOV FROM FPU

This microinstruction takes the values generated in the mantissa accumulator (57) and loads them into the mantissa portion and the exponent portion of the floating point register (44).

If it were not a FP register that was specified as a destination, then the divide operation will computer the quotient to sufficient precision that is necessary to produce a correctly rounded result to the 32-bit real format. The following microinstruction would move the result out on the data bus (50) into registers on the integer execution unit (24).

The LLM bits select the exponent bias constant in the exponent ROM (61). The RndPrec (0:1) bits select the rounding bits in the final result which is found in the shifter (54) and select the rounding constant in the mantissa ROM (58).

The above micro-operations have been described as if they were carried out in sequence. It will be readily understood by those skilled in the art that these operations may be carried out in parallel by replicating the logic.

While the invention has been particularly shown and described with reference to preferred embodiments thereof, it will be understood by those skilled in the art that the foregoing and other changes in form and detail may be made therein without departing from the scope of the invention.

What is claimed is:

1. In a data processor including an instruction decoder (12) and a floating point unit (22) connected together by a microinstruction bus (29) which carries a current microinstruction generated by said decoder in the course of the decoding of a macroinstruction by said decoder, said macroinstruction including a source address field, a destination address field, and an opcode field, said opcode field including first means (LL0, LL1) specifying the precision of arithmetic operations specified by said macroinstruction, the improvement characterized by:

said microinstruction generated by said instruction decoder (12) including second means (opcode 1) for indicating that the address range of said source or destination address in said macroinstruction includes the address of a floating point register (44) in said floating point unit 22; and, third means (73, 75) responsive to said second means (opcode 1) for modifying said first means (LL0, LL1) to specify extended precision.

2. The data processor of claim 1 wherein a pair of round precision bits (RND PREC 0, RND PREC 1) specify rounding modes of operation, further characterized by:

fourth means (85) responsive to said one bit for forcing said round precision bits to a value (84, 86) specifying an extended precision mode of operation upon the condition that said one bit is asserted.

3. The data processor of claim 1 further characterized by:

said first means in said opcode field being a pair of bits (LL1, LL2) specifying four precisions of arithmetic operations;

said instruction decoder (12) generating a microinstruction, one bit (opcode 1) of which specifies when asserted, that the address range of said source or destination address in said macroinstruction specify a floating point register (44) in said floating point unit (22); and, said third means (73, 75) is responsive to said one bit and forces said LL bits to a value (80, 82) specifying extended precision upon the condition that said one bit (opcode 1) is asserted.

4. The data processor of claim 3 wherein a pair of round precision bits (RND PREC 0, RND PREC 1) specify rounding modes of operation, further characterized by:

fourth means (85) responsive to said one bit (opcode 1) for forcing said round precision bits to a value (84, 86) specifying extended precision upon the condition that said one bit is asserted.

* * * * *